US012589807B2

(12) United States Patent
Oh et al.

(10) Patent No.: US 12,589,807 B2
(45) Date of Patent: Mar. 31, 2026

(54) VEHICLE BATTERY CASE

(71) Applicants: HYUNDAI MOTOR COMPANY, Seoul (KR); KIA CORPORATION, Seoul (KR)

(72) Inventors: Yu Ri Oh, Hwaseong-si (KR); In Gook Son, Incheon (KR); Seok Eun Yoon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 385 days.

(21) Appl. No.: 18/136,954

(22) Filed: Apr. 20, 2023

(65) Prior Publication Data

US 2024/0199125 A1     Jun. 20, 2024

(30) Foreign Application Priority Data

Dec. 15, 2022     (KR) ........................ 10-2022-0176024

(51) Int. Cl.
| | |
|---|---|
| *B60K 1/04* | (2019.01) |
| *B60L 50/60* | (2019.01) |
| *B62D 21/15* | (2006.01) |
| *H01M 50/249* | (2021.01) |
| *H01M 50/367* | (2021.01) |

(52) U.S. Cl.
CPC .............. *B62D 21/157* (2013.01); *B60K 1/04* (2013.01); *B60L 50/66* (2019.02); *H01M 50/249* (2021.01); *H01M 50/367* (2021.01); *B60K 2001/0438* (2013.01)

(58) Field of Classification Search
CPC ....... B62D 21/157; B60L 50/66; B60L 50/64; B60K 1/04; B60K 2001/0438; B60Y 2306/01; B60R 16/04
See application file for complete search history.

(56) References Cited

U.S. PATENT DOCUMENTS

| | | | |
|---|---|---|---|
| 10,741,809 B2 | 8/2020 | Kim et al. | |
| 11,859,385 B1 * | 1/2024 | Zhou .......................... | E04C 3/06 |
| 2019/0334144 A1 | 10/2019 | Kim et al. | |
| 2024/0055716 A1 * | 2/2024 | Gao ......................... | B60L 50/66 |
| 2024/0120589 A1 * | 4/2024 | Danneberg .............. | B60L 50/66 |

FOREIGN PATENT DOCUMENTS

KR          20190124368 A     11/2019

* cited by examiner

*Primary Examiner* — Daniel J Colilla
(74) *Attorney, Agent, or Firm* — Lempia Summerfield Katz LLC

(57) ABSTRACT

A vehicle battery case includes: a lower panel disposed on a bottom of a vehicle and configured to support a battery from below; a battery cross member disposed on the lower panel and extending in the width direction of the vehicle; and battery side members which are disposed on both sides of the lower panel in the longitudinal direction of the vehicle and in contact with both ends of the battery cross member. Each battery side member has a flange part which extends from the lower end thereof to the outside of the vehicle and is connected to a side sill, and a load applied to the side sill of the vehicle during a vehicle side collision is sequentially transferred from the battery side member to the battery cross member.

11 Claims, 5 Drawing Sheets

VEHICLE BATTERY CASE

CROSS-REFERENCE TO RELATED APPLICATION(S)

This application claims priority to Korean Patent Application No. 10-2022-0176024, filed on Dec. 15, 2022, the disclosure of which is herein incorporated by reference in its entirety.

BACKGROUND

1. Field

The present disclosure relates to a vehicle battery case and, more specifically, to a vehicle battery case wherein, in a structure in which a battery cross member and a battery side member are arranged, the structure of the battery cross member and the battery side member is changed to distribute a load in case of a vehicle side collision so that battery cells can be protected.

2. Description of the Prior Art

In recent years, interest in eco-friendly vehicles has increased due to environmental problems and high oil prices, and various electric vehicles designed to drive using electric energy have been developed.

As such electric vehicles, a battery-powered EV, a fuel cell EV using a fuel cell as an electric motor, and a hybrid EV using a motor and an engine together are being developed.

In particular, an electric vehicle may include a battery module for storing electric energy, and multiple battery cells may be accommodated in the battery module. A battery case may be disposed outside the battery module. A vehicle battery case is a device for storing a battery module used in a vehicle and protecting the battery from an external environment and a collision. In general, the battery capacity of an electric vehicle with a traveling distance of 400 km or more is 60 kWh or more. In this case, a protective device to protect a battery module is made of aluminum for weight reduction.

A load applied to a vehicle side sill when a side of a vehicle is impacted from the outside may be concentrated on a battery case and directly transferred to a battery module. In this case, battery cells accommodated in the battery module may malfunction or, in serious cases, may be damaged, thereby causing serious problems during traveling of the vehicle.

This requires a method for distributing a load by implementing a load path for side collision of the vehicle in the battery case of the vehicle.

The above descriptions regarding background technologies have been made only to help understanding of the background of the present disclosure, and are not to be deemed by those having ordinary skill in the art to correspond to already-known prior arts.

SUMMARY

An aspect of the present disclosure is to provide a vehicle battery case having a structure in which a battery cross member and a battery side member are arranged. In particular, when a vehicle side collision occurs, the arrangement of the battery cross member and the battery side member is changed to distribute a load generated from the vehicle side collision so that battery cells can be protected.

The technical subjects pursued in the present disclosure may not be limited to the above mentioned technical subjects, and other technical subjects which are not mentioned may be clearly understood, through the following descriptions, by those having ordinary skill in the art to which the present disclosure pertains.

In order to solve the above-described technical problems, the present disclosure provides a vehicle battery case including: a lower panel disposed beneath a vehicle (e.g., at the bottom of the vehicle) and configured to support a battery from below. The vehicle battery case further includes: a battery cross member disposed on the lower panel and extending in the width direction of the vehicle; and battery side members which are disposed on the lower panel. In particular, the battery side members are disposed on both sides of the lower panel in the longitudinal direction of the vehicle, and thus the battery side members are in contact with both ends of the battery cross member via inner surfaces of the battery side members. In one embodiment, each battery side member includes a flange part which extends from the lower end thereof to the outside of the vehicle and the flange part is connected to a side sill, wherein a load applied to the side sill of the vehicle during a vehicle side collision is sequentially transferred from the battery side member to the battery cross member.

In one embodiment, the battery cross member may have an inner space and may have a reinforcing rib formed in the inner space so that the load is transferred from the battery side member to the battery cross member.

For example, the reinforcing rib may include a first rib vertically disposed at the upper side of the inner space and a second rib horizontally disposed at the upper side of the inside space.

In one embodiment, the first rib and the second rib may extend from the inner surface of the battery cross member and may be disposed perpendicular to each other to form a closed section.

In one embodiment, the battery cross member may be shaped to have one open side through which venting gas generated from multiple battery cells in a battery cell thermal runaway situation is introduced.

In one embodiment, the battery side member may include a partition wall part, the inner surface of which is in contact with each of both ends of the battery cross member, and a connection part connecting a flange part and the partition wall part to each other in the diagonal direction.

In one embodiment, the flange part, the connection part, the partition wall part, and the second rib may be connected to each other to form a load path for a vehicle side collision.

In one embodiment, the second rib may be aligned with each rib constituting the partition wall part at an identical height with respect to the lower panel.

In one embodiment, the top of the battery side member may be positioned higher than the top of the battery cross member.

In one embodiment, the flange part may be connected to the side sill in the upward/downward direction so that the load is transferred from the side sill to the battery side member in a vertical direction.

In one embodiment, the vehicle battery case may further include battery center members disposed on the lower panel and extending in the longitudinal direction of the vehicle between both battery side members, wherein the battery cross member is disposed to cross the battery center members.

In one embodiment, the battery center members may be spaced apart from each other by the thickness of the battery cross member at a point where the battery center members cross the battery cross member. For example, at least one battery center member is formed with a gap at the point where at least one battery cross member crosses the at least one battery center member, and the gap corresponds to the thickness of the at least one battery cross member.

According to the vehicle battery case of the present disclosure, in a structure in which a battery cross member and a battery side member are arranged, the structure of the battery cross member and the battery side member may be changed to distribute a load in case of a vehicle side collision, thereby protecting battery cells.

Advantageous effects obtainable from the present disclosure may not be limited to the above mentioned effects, and other effects which are not mentioned may be clearly understood, through the following descriptions, by those having ordinary skill in the art to which the present disclosure pertains.

BRIEF DESCRIPTION OF THE DRAWINGS

The above and other aspects, features, and advantages of the present disclosure should be more apparent from the following detailed description taken in conjunction with the accompanying drawings, in which.

DETAILED DESCRIPTION

Figure 1:
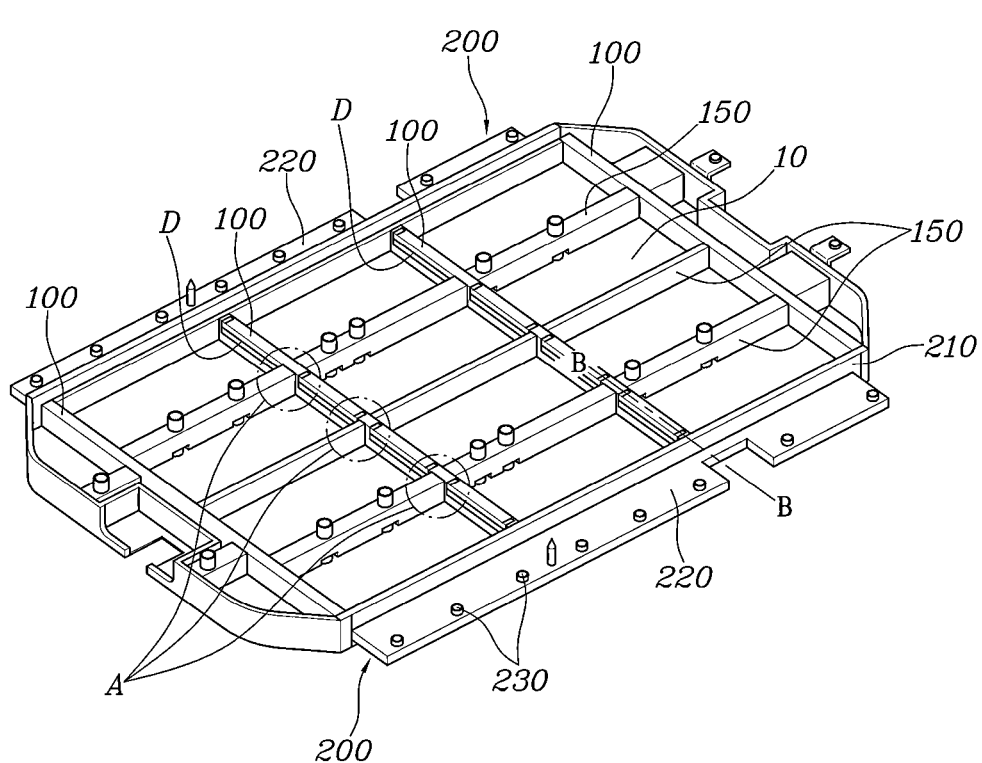
FIG. 1 illustrates a vehicle battery case according to an embodiment of the present disclosure.

Hereinafter, embodiments of the present disclosure are described in detail with reference to the accompanying drawings, and the same or similar elements are given the same and similar reference numerals, so duplicate descriptions thereof have been omitted.

The terms "module" and "unit" used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed description has been omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure. Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context. When a component, device, element, or the like of the present disclosure is described as having a purpose or performing an operation, function, or the like, the component, device, or element should be considered herein as being "configured to" meet that purpose or to perform that operation or function.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

An embodiment of the present disclosure proposes that, in a structure in which a battery cross member and a battery side member are arranged, a load in case of a vehicle side collision should be distributed by changing the structure of the battery cross member and the battery side member.

FIG. 1 illustrates a vehicle battery case according to an embodiment of the present disclosure. FIG. 1 mainly illustrates elements related to the present embodiment, and in actual implementation of the vehicle battery case, fewer or more elements may be included.

Referring to FIG. 1, a vehicle battery case according to an embodiment may include a lower panel 10, a battery cross member 100, and a battery side member 200.

The lower panel 10 is disposed at a bottom of a vehicle and may support a battery from below. More specifically, the lower panel 10 may be disposed below a vehicle frame in order to position the center of gravity of the vehicle as low as possible.

In one embodiment, multiple battery cross members 100 may be disposed on the lower panel 10 while extending in the width direction of the vehicle. The battery cross members 100 may be spaced at equal intervals so that a load is transmitted to each of the battery cross members 100 in the event of a vehicle side collision. At this time, the battery cross member 100 may have an inner space D and a venting channel 110 through which gas generated from multiple battery cells in a battery cell thermal runaway situation is introduced. Reinforcing ribs 111 and 112 may be formed in the inner space D so that the load is transferred from the battery side member 200 to the battery cross member 100. Specific shapes of the venting channel 110 and the reinforcing ribs 111 and 112 are described below.

Figure 2:
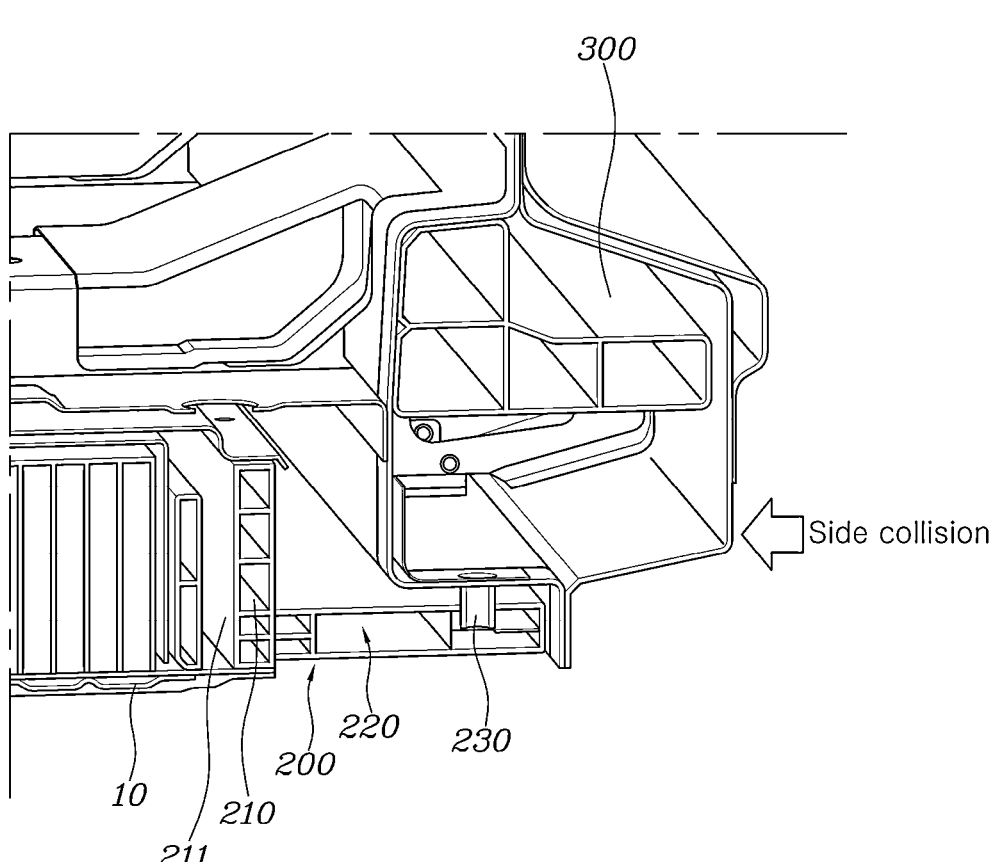
FIG. 2 illustrates a battery side member connected to a side sill according to an embodiment of the present disclosure.

FIG. 2 illustrates a battery side member 200 connected to a side sill 300 according to an embodiment of the present disclosure.

Referring to FIG. 2, the battery side member 200 may be disposed on a lower panel 10 and may be disposed on each of both sides of the lower panel 10 in the longitudinal direction of a vehicle. A flange part 220 may extend from the lower end of the battery side member 200 toward the outside of the vehicle to distribute a load in case of a vehicle side collision.

More specifically, as shown in FIG. 2, the flange part 220 may be connected to the side sill 300 in the upward/downward direction by a fixing part 230. The connection using the fixing part 230 may transfer the load to the lower side of the battery side member 200 in the vertical direction, thereby minimizing the transfer of the load to a battery cell positioned at the side of the battery side member 200. The battery side members 200 may have inner surfaces 211 in contact with both ends of the battery cross member 100 so that a load applied to the vehicle side sill 300 in the event of a vehicle side collision is sequentially transferred from each of the battery side members 200 to the battery cross member 100.

In addition, a battery center member 150 may be disposed on the lower panel 10 separately from the battery cross member 100 and the battery side member 200 described above. Here, multiple battery center members 150 may be disposed and extend between both battery side members 200 in the longitudinal direction of the vehicle. Thus, the load applied to the vehicle side sill 300 may be transferred sequentially from the battery side member 200 to the battery cross member 100 and from the battery cross member 100 to each of the battery center members 150. The battery center member 150 may be disposed to cross the battery cross member 100, and thus may receive a load from the battery cross member 100 to distribute the load in case of a vehicle side collision.

In addition, since the battery center member 150 extends in the longitudinal direction of the vehicle, there is a point at which the battery center member 150 crosses the battery cross member 100 extending in the width direction. Referring to the reference character "A" in FIG. 1, the battery center member 150 is spaced apart by the thickness of the battery cross member 100 at the point (i.e., A) where the two members cross each other. In other words, at the point "A" where at least one battery cross member 100 crosses at least one battery center member 150, the at least one battery center member 150 is formed with a gap (A) corresponding to a thickness or a width of the at least one battery cross member, and thus the two members may be naturally connected to each other whereby a load can be distributed. Here, rigidity at the point where the battery center member 150 crosses the battery cross member 100 may be increased by welding.

Figure 3:
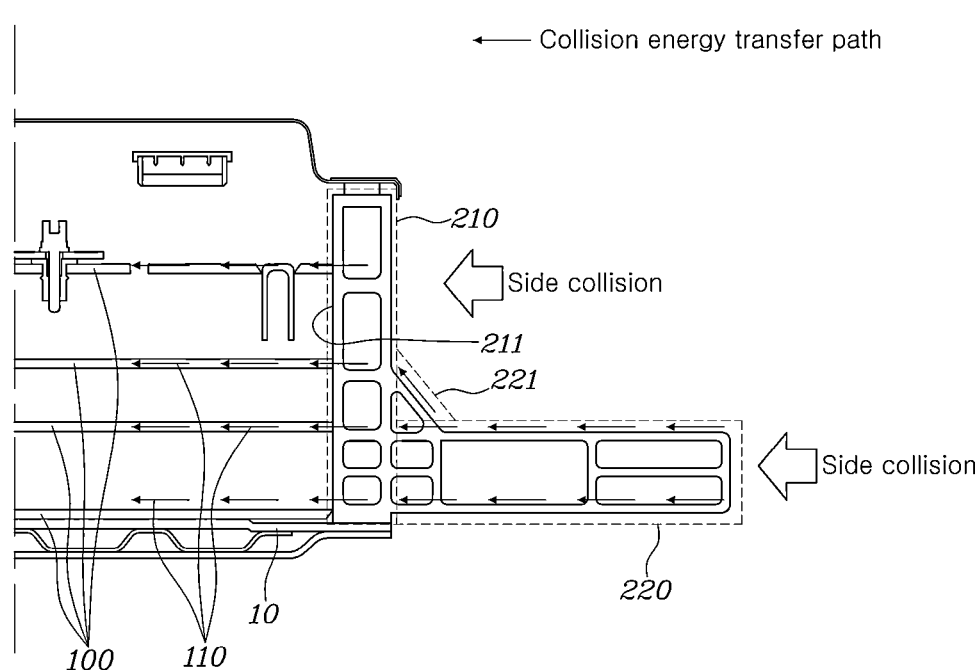
FIG. 3 illustrates a path through which a load is sequentially transferred from a battery side member to a battery cross member during a vehicle side collision according to an embodiment of the present disclosure.

FIG. 3 is a cross-sectional view taken along line B in FIG. 1 and illustrating a path through which a load is sequentially transferred from the battery side members 200 to the battery cross member 100 during a vehicle side collision according to an embodiment of the present disclosure.

Referring to FIG. 3, the battery side member 200 may include a flange part 220, a partition wall part 210, and a connection part 221. The partition wall part 210 has an inner surface 211 in direct contact with both ends of the battery cross member 100 and extends toward the upper side of the vehicle. Also, the connection part 221 may connect the flange part 220 and the partition wall part 210 to each other in a diagonal direction. Each of the flange part 220 and the partition wall part 210 has a rib formed therein, and thus has the increased rigidity.

Figure 5:
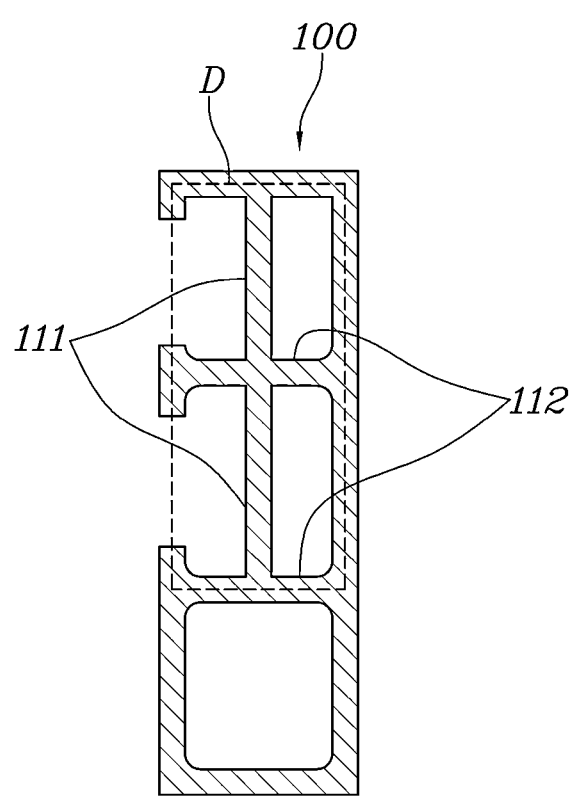
FIG. 5 illustrates a battery cross member having reinforcing ribs formed in the inner space thereof according to an embodiment of the present disclosure.

The direction of an arrow in FIG. 3 represents a path in which a load applied to the side sill 300 of the vehicle during a side collision of the vehicle sequentially transferred to the battery cross member 100 via the battery side member 200. As shown in FIG. 5, the battery cross member 100 may include a first rib 111 vertically disposed at the upper side of an inner space D thereof and a second rib 112 horizontally disposed at the upper side of the inner space D. The flange part 220, the connection part 221, the partition wall part 210, and the second rib 112 may be connected to each other to form a load path for a vehicle side collision so that the load applied to the vehicle side sill 300 can be distributed.

Furthermore, as shown in FIG. 3, the second rib 112 may be aligned with each rib constituting the partition wall part 210 at an identical height with respect to the lower panel 10, so that the load can be more efficiently distributed from the battery side member 200 to the battery cross member 100.

The top of the battery side member 200 may be positioned higher than the top of the battery cross member 100. Thus, when an excessive impact force is applied and thus a load is directly applied to the partition wall part 210, multiple battery cells positioned at the side of the battery cross member 100 may be protected.

Figure 4:
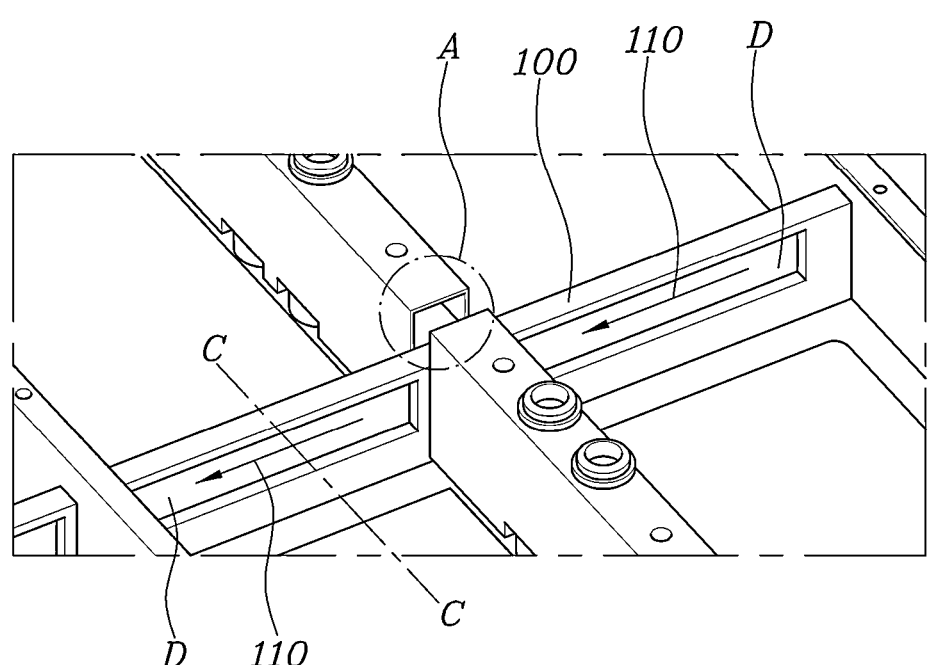
FIG. 4 illustrates a battery cross member shaped to have one open side according to an embodiment of the present disclosure.

FIG. 4 illustrates a battery cross member 100 shaped to have one open side according to an embodiment of the present disclosure.

Referring to FIG. 4, the battery cross member 100 may have a venting channel 110 through which gas generated from multiple battery cells in a battery cell thermal runaway situation is introduced. The venting channel 110 is formed in a shape in which one side of the battery cross member 100 is open, and multiple battery cross members 100 disposed on the lower panel 10 are shaped to be open in a direction in which the battery cells are positioned. Therefore, the battery cross member 100 positioned at each of both ends in the longitudinal direction of the vehicle may be shaped to have one open side, and the battery cross member 100 positioned between both ends may be shaped to have both open sides. Thus, venting gas generated in battery cells may be moved through the venting channel 110 and the venting gas may be discharged to both sides of the lower panels 10, whereby damage may be minimized in a thermal runaway situation.

FIG. 5 is a cross-sectional view taken along line C-C in FIG. 4 and illustrating a battery cross member 100 having reinforcing ribs 111 and 112 formed in the inner space D thereof according to an embodiment of the present disclosure.

Referring to FIG. 5, as described above, the reinforcing ribs 111 and 112 may include a first rib 111 and a second rib 112, the first rib 111 may be vertically disposed at the upper side of an inner space D thereof, and the second rib 112 may be horizontally disposed at the upper side of the inner space D. When a flame is generated in a battery cell thermal runaway situation, the first rib 111 may form a partition wall in a vertical direction to prevent transfer of the flame between battery cells. In addition, as described above, the flange part 220, the connection part 221, the partition wall part 210, and the second rib 112 are connected to each other to form a load path for a vehicle side collision, and thus, in the event of the vehicle side collision, a load may be transferred from the battery side member 200 to the battery cross member 100.

In addition, the first rib 111 and the second rib 112 may extend from the inner surface of the battery cross member 100 and may be disposed perpendicular to each other to form a closed section. Thus, a flame may be prevented from being transferred to other battery cells in a battery cell thermal runaway situation, and venting gas generated from battery cells may be discharged to both sides of lower panel through the closed cross section without affecting the entire battery cross member 100.

According to the above-described embodiments of the present disclosure, in a structure in which a battery cross member and a battery side member are arranged, the structure of the battery cross member and the battery side member may be changed to distribute a load in case of a vehicle side collision so that battery cells can be protected.

Although the present disclosure has been described and illustrated in conjunction with particular embodiments thereof, it should be apparent to those having ordinary skill in the art that various improvements and modifications may be made to the present disclosure without departing from the technical idea of the present disclosure.

What is claimed is:

1. A vehicle battery case comprising:

a lower panel disposed at a bottom of a vehicle and configured to support a battery from below;

a battery cross member disposed on the lower panel and extending in a width direction of the vehicle; and battery side members disposed on sides of the lower panel in a longitudinal direction of the vehicle such that the battery side members are in contact with both ends of the battery cross member via inner surfaces of the battery side members, wherein each of the battery side members includes a flange part which extends from a lower end thereof to an outside of the vehicle and is connected to a side sill, wherein a load applied to the side sill of the vehicle during a vehicle side collision is sequentially transferred from the battery side member to the battery cross member, and wherein the battery side member includes a partition wall part including the inner surface in contact with one of the ends of the battery cross member, and a connection part connecting the flange part and the partition wall part to each other in a diagonal direction.

2. The vehicle battery case of claim 1, wherein the battery cross member is configured to have an inner space and includes a reinforcing rib formed in the inner space so that the load is transferred from the battery side members to the battery cross member.

3. The vehicle battery case of claim 2, wherein the reinforcing rib comprises: a first rib vertically disposed at an upper side of the inner space; and a second rib horizontally disposed at the upper side of the inside space.

4. The vehicle battery case of claim 3, wherein the first rib and the second rib extend from an inner surface of the battery cross member and are disposed perpendicular to each other to form a closed section.

5. The vehicle battery case of claim 3, wherein the flange part, the connection part, the partition wall part, and the second rib are connected to each other to form a load path for the vehicle side collision.

6. The vehicle battery case of claim 3, wherein the partition wall part includes at least one rib, and the second rib is aligned with the at least one rib of the partition wall part at an identical height with respect to the lower panel.

7. The vehicle battery case of claim 1, wherein the battery cross member is shaped to have one open side through which gas generated from multiple battery cells in a battery cell thermal runaway situation is introduced.

8. The vehicle battery case of claim 1, wherein a top of the battery side members is positioned higher than a top of the battery cross member.

9. The vehicle battery case of claim 1, wherein the flange part is connected to the side sill in an upward/downward direction so that the load is transferred from the side sill to the battery side members in a vertical direction.

10. The vehicle battery case of claim 1, further comprising battery center members disposed on the lower panel and extending in the longitudinal direction of the vehicle between the battery side members, wherein the battery cross member is disposed to cross the battery center members.

11. The vehicle battery case of claim 10, wherein at least one battery center member is formed with a gap at a point where at least one battery cross member crosses the at least one battery center member, and the gap corresponds to a thickness of the at least one battery cross member.

* * * * *